Dec. 25, 1951     G. B. R. FEILDEN     2,580,162
LOAD MEASURING DEVICE

Filed Sept. 13, 1945     2 SHEETS—SHEET 1

Inventor
Geoffrey Bertram Robert Feilden
By
Stevens and Davis
his Attorneys

Dec. 25, 1951  G. B. R. FEILDEN  2,580,162
LOAD MEASURING DEVICE
Filed Sept. 13, 1945  2 SHEETS—SHEET 2
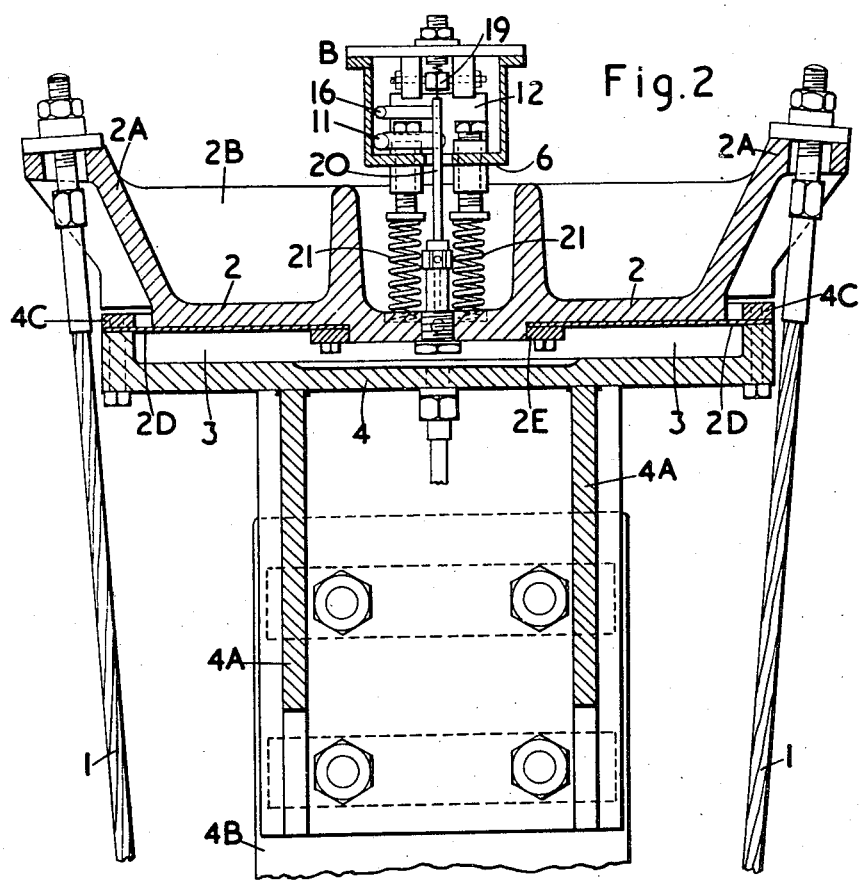
Fig.2
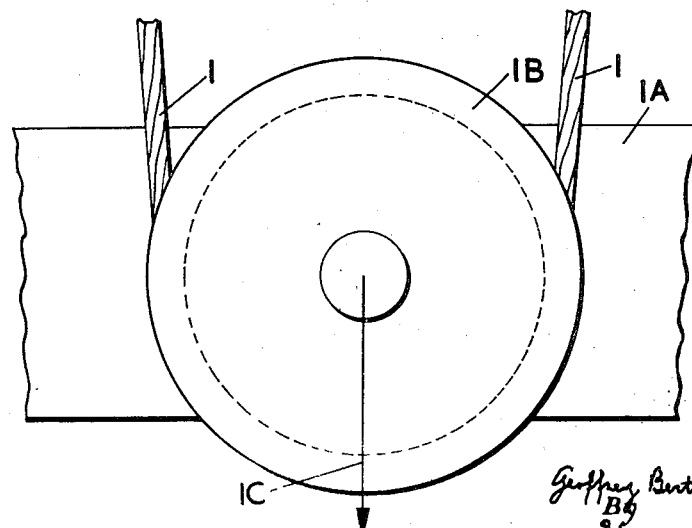
Inventor
Geoffrey Bertram Robert Feilden
By
Stevens and Davis
his Attorneys Patented Dec. 25, 1951

2,580,162

UNITED STATES PATENT OFFICE 2,580,162

LOAD MEASURING DEVICE

Geoffrey Bertram Robert Feilden, Lutterworth, near Rugby, England, assignor to Power Jets (Research & Development) Limited, London, England Application September 13, 1945, Serial No. 616,031
In Great Britain March 15, 1943

Section 1, Public Law 690, August 8, 1946
Patent expires March 15, 1963

6 Claims. (Cl. 73—141)

This invention relates to load measuring devices and it is more especially intended for use in measuring, indicating, and, if required, recording the thrust of propulsive systems, weight loads, torsional loads, or the like. It is a matter of some practical difficulty to measure with accuracy variable loads such for example as thrust. The present invention seeks to provide means for doing this or similar duty in a convenient and reliable manner which will give consistent results without the necessity for frequent calibration and which moreover enables remote readings or recordings to be taken without difficulty. The device is in essence hydraulic, but since it depends on a substantially continuous flow of hydraulic fluid, it can be made so that it will continue to operate satisfactorily even in conditions where there is some leakage; moreover it is virtually free from adverse frictional effects. Where rapidly fluctuating loads are to be dealt with, the device can be arranged to give a mean reading, since it is amenable to varying degrees of damping, or it may give a rapid response. The device lends itself conveniently to the recording of loadings since a substantial force is available for this purpose and any suitable recording manometer device can be used as a receiver. As will be described below, the device is contrived so as to be suitable for the measuring of thrusts of engines such as aero engines, it being assumed that the engine is mounted on a suitable bed for its thrust to be freely transmissible. An important advantage of the invention is that it operates without permitting substantial movement of the source of measured force.

According to the invention, means are provided for measuring a variable load comprising a movable load-transmitting wall (in the nature of an annular flexible diaphragm) forming part of a hydraulic pressure chamber, valve means to control escape of fluid from the chamber in response to movement of the movable wall, means for maintaining an unrestricted supply of fluid under pressure in the chamber, and means for indicating the fluid pressure in the chamber. The movable wall is in sealed connection with the remainder of the structure of the chamber, which is anchored and thus forms the reaction point of the load, and the movable wall is preferably connected to the valve means through mechanical means which multiply the valve movements relatively to those of the wall. The wall has a flexible marginal portion which in operation takes up a symmetrical sectional shape such that the tensile stress in its material is equal in the two limbs of its U-like section (the limbs of the U being equal); the invention includes means for accommodating slight tilting or misalignment of the movable wall without upsetting the operations of the valve means; pre-loading of the wall; and supporting the weight of the wall, which is desirable where the device is in use horizontally.

There is a published prior proposal for measuring force of fluid pressure by measuring the pressure of a compensating fluid, in which the latter fluid is admitted to and permitted to escape from an elastic chamber at a varying rate of flow by two valves (one of which may have a permanent small leakage), the action of which is controlled by movement due to differences between the force or pressure to be measured and the pressure of the compensating fluid. Such a device, whilst possibly having advantages in some applications, e. g. in a flowmeter, would, it is believed, have disadvantages in other applications, such as that which is the subject of the preceding description. In the present device only one valve is required, and that is the valve which controls the pressure of the fluid in the chamber.

The invention will now be more particularly described by reference to the accompanying drawings, in which Fig. 1 is a partially diagrammatic sectional elevation of the main part of the device.

Fig. 2 is a similar plan view of the same, indicating also a test frame in fragmentary manner.

Fig. 3 is an enlarged sectional view of the valve means.

Figure 1:
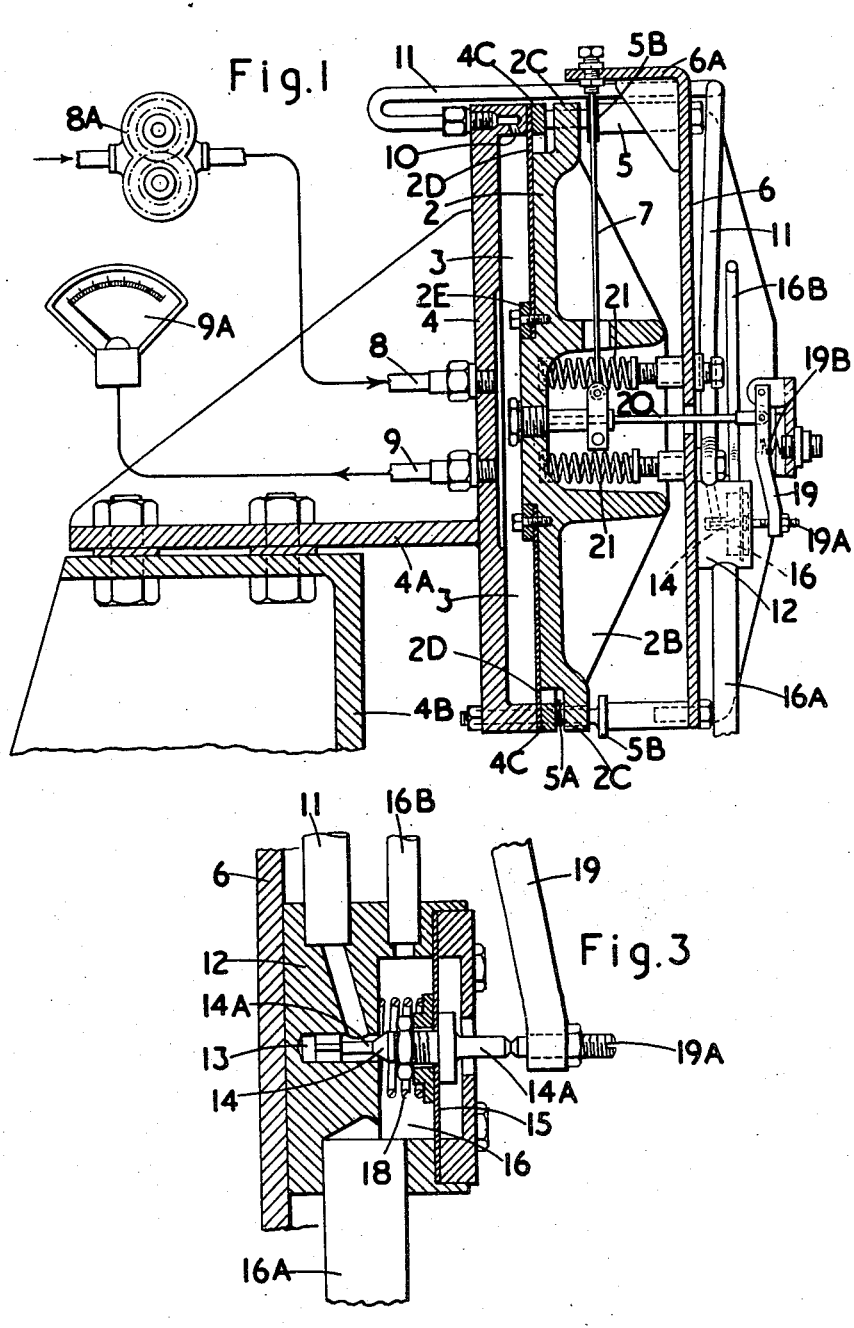

The device illustrated is a form of the invention evolved for indicating the thrust of an aero-engine which is mounted on a test frame (part of which is indicated at 1A, Fig. 2) such that a direct horizontal thrust is transmissible from the frame to this device. Referring to Fig. 2, the cable 1 passes over a free pulley 1B on the engine test frame (out of the view to the left) so that the thrust of the engine (the line of which is indicated by the arrow 1C) produces equal tension in the cable. The ends of the cable 1 are attached to radially projecting lugs 2A of a disc-like robust metal wall 2, which is stiffened by ribs 2B. The wall 2 is a movable wall, forming one part of a hydraulic pressure chamber 3, the other part of which is constituted by fixed structure 4 in the form of a shallow cylinder anchored by a bracket 4A to a strong base 4B, the parts 4, 4A, 4B forming the reaction point for the load to be measured. The structural part 4 supports, by bolts 5 on which are suitable spacers, a partial bridging or cover plate 6 with which is combined a valve mounting. The bolts 5 pass outside the wall 2 but act as guides for it, forked lugs 2C being provided on wall 2 to coact with the bolts, the forks being a free clearance fit about the bolts and not normally in contact with them. The forked ends of the lugs 2C also lie between stops at 5A and 5B to prevent excessive movements of the wall 2, for example when the device is out of use or should hydraulic pressure fail.

From a suitable overhanging extension 6A of the plate 6 there hangs a suspension wire 7 which is connected to the wall 2 at a point approximating to the centre of mass of the wall so that, where the device is used horizontally (as in the described case) the weight of the wall 2 is taken off its other attachments and its tendency to tilt or sag is countered.

Into the chamber 3 is led a pressure pipe 8 from a hydraulic pump indicated at 8A, this representing a continuous unrestricted supply of pressure fluid. Also connecting by pipe 9 from the chamber 3 is a pressure gauge 9A which is marked to indicate thrust, e. g. in pounds. This gauge may be replaced by a liquid-column manometer or by any device required to interpret fluid pressures in useful terms or effects. The source of pressure fluid is such that a rate of flow is maintained constantly irrespective of the pressure. It is found convenient, with this in mind, to employ as the pump 8A a gear type pump, which is virtually a positive-displacement type, suitably powered and proportioned to cover the whole pressure range required. It is such a source that the phrase "continuous unrestricted supply" is intended to define.

The wall 2 is faced inwardly with a sheet of rubberised fabric 2D the inner margin of which is clamped by a ring 2E, whilst the peripheral margin, extending beyond the flat face of the wall 2, is clamped to the edge of the skirt of the part 4 by a ring 4C (which may also provide or support the stops 5A). Thus there is an unsupported flexible annular marginal portion of the wall of the chamber 3, comparatively small in area, but sufficient to allow the part 2 to move the minute amount required, and to float freely during operation. It is to be noted especially that the operational position of the wall 2 is such that the plane of attachment of the edge of the sheet 2D is the same as that in which the flat face of the wall 2 lies and this condition (which is illustrated) is within very small limits (say, .001") maintained in operation. The result of this arrangement is that when the unsupported margin of 2D is bellied out by pressure in chamber 3, its section will be symmetrical. That is to say, its U-like figure will have limbs which will be equal in length, with the result that the tensile stress in the fabric will be equalised, so that the pressure load on the wall 2 as a whole, is not variable or affected to the detriment of accurate measurement, by the flexible portion either imposing or relieving part of the load not computed in design. The location of the lugs 2C between their stops 5A, 5B, can be used as a visual check to show that the wall 2 remains in its selected location.

On the plate 6 is carried the valve means (see Fig. 3). From the uppermost point of the chamber 3 leads a duct 10 and pipe 11, around the outside of the above described parts, into a valve body 12 mounted on the outside of the plate 6. Within this body 12 is a bore 13 (connected to the pipe 11) terminating at a valve seat coacting with a valve 14 on a stem 14A, the inner end of which guides the valve in the bore 13 and the outer end of which acts as a pushrod for seating the valve. The stem 14A is sealed to a flexible diaphragm 15 (to prevent leakage without setting up noticeable friction or resistance) which encloses a drain chamber 16 from which a drain pipe 16A returns hydraulic fluid to the initial supply reservoir. Within the chamber 16 is a compression spring 18 tending to open the valve.

Pivoted as freely as possible to the plate 6 is a rocker arm or lever 19 the end of which, through an adjustment screw 19A bears on the valve stem 14A. Between the lever 19 and a spherical socket in the centre of the wall 2 is a push rod 20, ball ended to bear in the socket fairly, and freely pivoted to the lever 19, for example with a knife-edge bearing. The lever 19 is acted upon by a small compression spring 19B to take up bearing clearances and for fine adjustment of initial setting of the valve. It will be seen that movements of the wall 2 are multiplied up at the valve, by reason of the lever ratio.

Pre-load springs 21 in compression between the wall 2 and the plate 6, urge the wall towards the chamber 3, i. e. in the same sense as that in which the load to be measured will act. This pre-loading, of which account may be taken in initial setting and calibration of the device, has certain advantages, one being to make the device "alive" as soon as hydraulic pressure is supplied, even if no load has yet been applied externally. It also facilitates any initial "zero" setting to be done.

The operation of the device has probably become apparent, but may usefully be summarised thus. Assuming the pump 8A to be running, any collected air in the chamber 3 is expelled through the duct 10, pipe 11, past the valve 14, and through the drain pipe 16A or a vent pipe (16B) provided for the purpose. When the hydraulic system is cleared of air, the hydraulic pressure in 3 forces the wall 2 outwards against the combined spring resistance of the springs 21 (neglecting the effects of the minor springs 18, 19B) and simultaneously opening the valve 14 to exactly that extent which will pass fluid at the delivery rate whilst preventing a further rise in pressure within chamber 3. The gauge 9A (if adjusted and having a real zero) will now show a load corresponding to that in the springs, and the device will remain stable. Now if a thrust be applied such as to tense the cables 1 this moves the wall 2 inwards, the valve 14 simultaneously moving towards the closed position until the pressure in the chamber 3 exactly resists the thrust load, which is now to be read on the gauge 9A. The valve is always automatically so adjusted that it passes the rate of flow determined by the source, at the pressure shown by the gauge. With proportions of the order shown in the drawings, the movements of the wall 2 over the whole operative range of the device, are extremely small, loads from a few pounds up to, say, 2,000 lbs, corresponding to wall movements of the order .001". Variation of thrust instantly causes movement of the wall 2, and instant corresponding movement of the valve with appropriate change of pressure.

It will be noted that the chamber pressure is not dependent on any fixed delivery pressure from the source at 8A, and thus is not dependent on any further relief valve or other external pressure control. The pressure is controlled only by the valve 14, which is, in one aspect, simply a pressure control valve the loading upon which is a function of the force to be measured.

When constructed as above described this device shows itself to be extremely accurate and sensitive and free from hysteresis or "hunting." If extremely rapid fluctuations of load were to be expected or any rapid cyclic changes, restriction may be deliberately imposed in the hydraulic system e. g. by selecting small bore for part or all of pipe 9, to damp out gauge fluctuations and in this way it may be found possible to obtain "average" readings.

It may be mentioned, since it is perhaps not quite obvious from the foregoing description, that for design purposes the "piston area" or effective hydraulic area of the movable wall is that defined by the diameter measured half way across the annulus of unsupported part 2D and not the full diameter thereof (see previous remarks on the symmetry of this annulus).

I claim:

1. Apparatus for measuring variable load comprising a fixed element forming a chamber with a circular opening, a rigid circular wall element mounted concentrically in said opening, a pliable annular diaphragm extending between the margin of said wall element and the margin of said opening, said element and diaphragm constituting a hydraulic pressure chamber with an axially movable wall, means external to said chamber to apply the variable load to said wall element, supporting structure enabling said fixed element to react to the load, an open and unrestricted delivery conduit leading into said chamber, means for delivering through said conduit a supply of liquid continuously and at a constant rate independent of variations of pressure in said liquid, an outlet conduit for leading said liquid from said chamber and back to said delivery means, valve means in said outlet conduit to permit a continuous but controlled flow of liquid in response to axial movement of said wall, means for ensuring that the ratio between the forces on the inner and outer edges of the diaphragm is constant, and means for indicating the pressure of the liquid in said chamber.

2. Apparatus according to claim 1 comprising means for ensuring that the inner and outer edges of said diaphragm are substantially in the same plane.

3. Apparatus according to claim 2, comprising a lever system operatively connected between said wall and said valve means to transmit and magnify movement of said wall.

4. Apparatus according to claim 3, further comprising resilient means to preload the wall in the sense of contracting the volume of the chamber.

5. Apparatus according to claim 3 further comprising means to suspend the weight of the wall element.

6. Apparatus according to claim 3 in which the outlet conduit communicates with the uppermost point of said chamber to bleed the chamber of air and in which the operating fluid is a liquid.

GEOFFREY BERTRAM ROBERT FEILDEN.

REFERENCES CITED

The following references are of record in the file of this patent:

UNITED STATES PATENTS

| Number | Name | Date |
|---|---|---|
| Re. 14,206 | Gibson | Oct. 24, 1916 |
| 1,129,073 | Connet | Feb. 23, 1915 |
| 1,191,415 | Gibson | July 18, 1916 |
| 1,202,053 | Gibson | Oct. 24, 1916 |
| 1,272,212 | Callan | July 19, 1918 |
| 1,298,630 | Schmidt | Mar. 25, 1919 |
| 1,435,603 | Hanser | Nov. 14, 1922 |
| 1,580,430 | Gaines | Apr. 13, 1926 |
| 1,682,602 | Dawley | Aug. 28, 1928 |
| 1,753,469 | Melas | Apr. 8, 1930 |
| 1,949,908 | Hawk | Mar. 6, 1934 |
| 1,972,054 | Moller | Aug. 28, 1934 |
| 2,013,810 | Shimek | Sept. 10, 1935 |
| 2,131,486 | Spitzglass | Sept. 27, 1938 |
| 2,233,498 | Taylor | Mar. 4, 1941 |
| 2,265,114 | Hartley | Dec. 2, 1941 |
| 2,331,871 | Tate | Oct. 19, 1943 |